Aug. 30, 1927. Re. 16,729
G. M. RUSSELL
AUTOMATIC MUSICAL INSTRUMENT
Original Filed Dec. 26, 1917
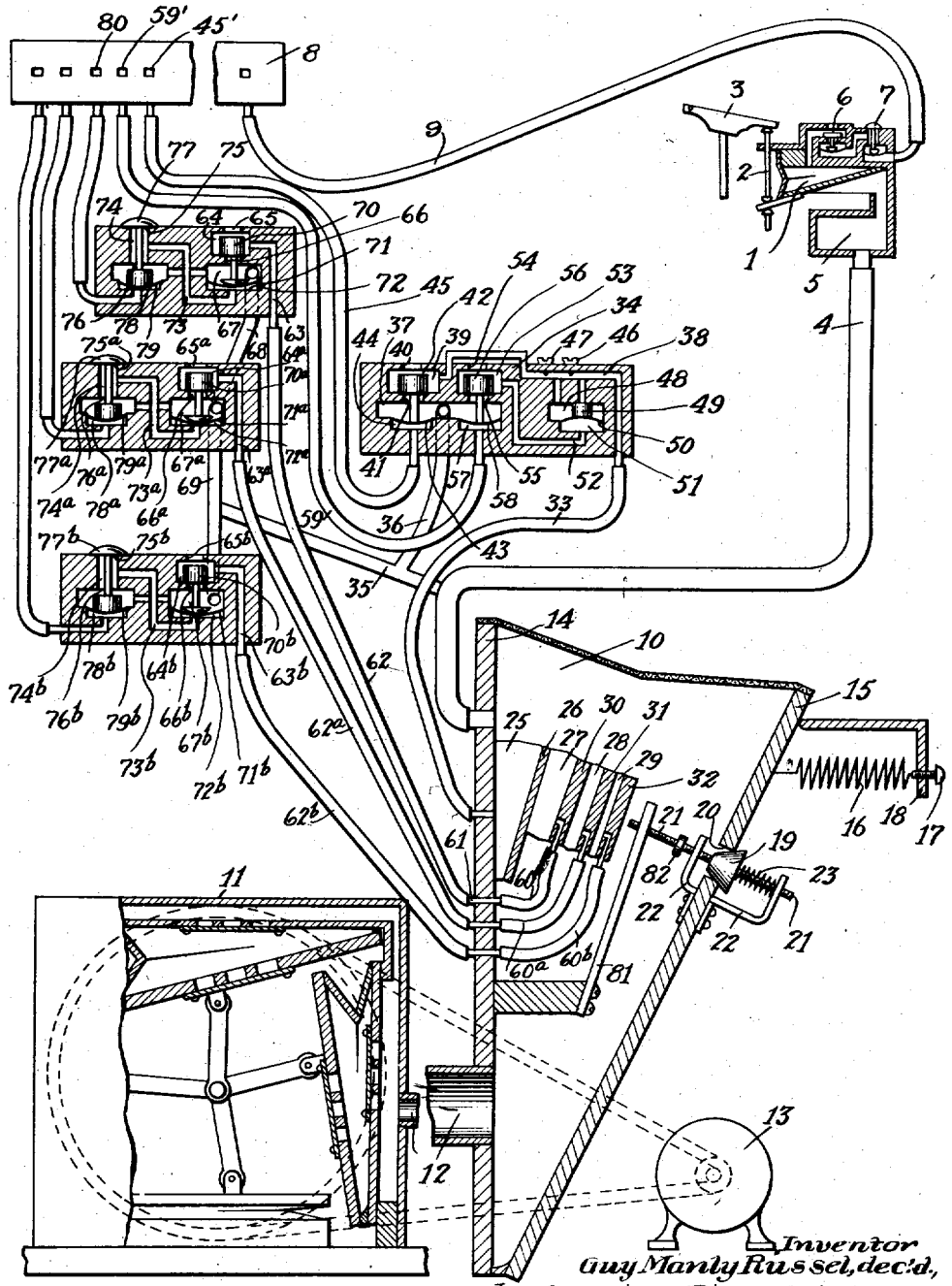
Inventor
Guy Manly Russel, dec'd,
by American Piano Co. Assignee.
BY
Emery, Booth, Janney & Varney
Its ATTORNEYS Reissued Aug. 30, 1927. Re. 16,729

UNITED STATES PATENT OFFICE.

GUY MANLY RUSSELL, DECEASED, LATE OF SYRACUSE, NEW YORK; BY AMERICAN PIANO COMPANY, OF NEW YORK, N. Y., ASSIGNEE.

AUTOMATIC MUSICAL INSTRUMENT.

Original No. 1,409,497, dated March 14, 1922, Serial No. 208,758, filed December 26, 1917. Application for reissue filed March 12, 1924. Serial No. 698,783.

This invention relates to automatic means for playing musical instruments such, for instance, as pianos; and pertains more particularly to means for governing and varying tone intensities.

The principal object of the invention is to provide apparatus capable of producing a great number of variations in intensity of playing; such apparatus comprising preferably, though not essentially, a combination of means for producing crescendo and diminuendo effects and also for instituting various defined grades or steps of playing intensities.

For illustration the accompanying drawings show diagrammatically one practicable embodiment of the invention employing suitable pneumatically governed devices in cooperation with a piano action; but as will appear to those skilled in the art, the invention is susceptible of embodiment in various constructions and organizations other than that particularly shown and described herein. It will be equally apparent that all the features of the invention need not be used conjointly since their respective advantages may accrue from their separate application in any practicable manner to a suitable instrument.

The drawings consist of a diagrammatic representation of a portion of a typical player action with operating and governing means exemplifying the application and utility of the invention.

In the drawings a striker or player pneumatic 1 is provided, having a sticker 2 to act upon a wippen 3 and thereby operate the usual piano action, as well understood in the art. A wind trunk 4 leads to a wind chest 5 for the player pneumatics, each of which has a secondary valve 6 controlled by a primary valve 7 which is operated from a tracker board 8 through a duct 9 in the usual manner.

The wind trunk 4 communicates with the interior of a reservoir bellows 10. An exhaust pump 11 constitutes a main source of power and is directly connected with the reservoir bellows 10 by a duct 12. The exhaust pump may be driven by an electric motor 13. For convenience the exhaust pump and motor are shown on a greatly reduced scale and it will of course be understood that any suitable exhausting apparatus, whether power driven or not may be employed in carrying out the invention.

The bellows 10 has a stationary board 14 and a movable board 15. Attached to the movable board is a spring 16 which at its outer end is fast to an adjusting screw 17 threaded in a fixed abutment 18. The reservoir bellows is provided with a relief valve 19 cooperating with a port 20 opening to the bellows and herein conveniently located in the movable board 15. The valve 19 is threaded upon a valve stem 21 and supported by a suitable bracket 22. A light spring 23 tends normally to hold the valve 19 against its seat.

In operation the pump 11 tends to exhaust air from the bellows 10, from the wind trunk 4, and the wind chest 5 with which the player pneumatics are connected selectively. It will be readily understood by those skilled in the art that the intensity with which any note or notes are sounded will bear a certain relation to the degree of exhaust within the wind chest 5, and that the degree of exhaust within the wind chest 5 can be controlled through the operation of the valve 19. For controlling the valve 19 a bellows apparatus is provided which will be presently described.

Apparatus embodying this invention may have a three-fold capacity for controlling the valve 19 and the consequent degree of exhaust within the wind chest 5. The apparatus may perform a regulating function, that is it may maintain any given playing intensity whether one or many notes be sounded; it may produce automatically continuously progressive changes in playing intensities for crescendo and diminuendo purposes; and it may produce automatically incremental changes in playing intensities.

These three capacities of the apparatus will be described in the sequence indicated.

The bellows apparatus previously referred to is herein shown mounted within the reservoir bellows 10 and preferably attached to its fixed board 14. It comprises a bellows 25 having a movable board 26 hinged to the fixed board of the reservoir bellows 10, and a number of bellows attached to the movable board 26 of the bellows 25. Herein are shown three bellows 27, 28 and 29 separated by movable boards 30, 31 and 32. In describing the regulating function of the valve 19 it may be assumed that the bellows 25, 27, 28 and 29 are open to atmosphere and as it will later appear a degree of exhaust within the wind chest 5 will thereby be established which is appropriate to lowest or minimum playing intensity.

The operation of the pump 11 will tend to exhaust air from the reservoir bellows 10. The reduction in pressure within the reservoir bellows 10 will create a differential between exhaust pressure and atmospheric pressure which, acting upon the movable board 15, will tend to move the board 15 against the pull of the spring 16. This reduction in pressure will also create a differential between exhaust pressure and atmospheric pressure which, acting upon the bellows apparatus will tend to hold the four bellows 25, 27, 28 and 29 in fully expanded position. As the reservoir bellows collapses the stem 21 will bear against the board 32 of the bellows 29 and hold the valve so that upon further collapse of the reservoir bellows atmosphere will be admitted through the port 20. When this opening of the port 20 takes place the tension of the spring will substantially equal the force provided by the differential between the exhaust and atmosphere acting upon the area of the board 15. Therefore, by proper adjustment of the valve upon its stem or of the spring through its adjusting nut, a normal minimum degree of exhaust may be established.

During the playing of the instrument atmosphere is being admitted in varying amounts, principally by the operation of the player pneumatics which when at rest contain atmosphere. To maintain the pressure substantially uniform the admission of atmosphere through the player pneumatics may be compensated by a corresponding lessening of the amount of atmosphere being admitted past the valve 19. A sudden influx of atmosphere through the player pneumatics may cause a momentary slight decrease in the pressure within the reservoir bellows. This slight decrease will permit the board 15 to move toward the valve thus closing slightly the atmosphere port. This in turn will cause the pump to take a relatively larger amount of air from the wind chest 5 and thereby restore the normal minimum degree of exhaust. The reservoir bellows and its valve respond so quickly to minute fluctuations of exhaust within the wind chest 5, that the effect is rather to maintain the degree of exhaust than to restore it, as will be readily understood by those skilled in the art.

Having described the regulating functions of the apparatus, the means for producing crescendo and diminuendo effects will now be described.

It will be readily understood by those skilled in the art that if any one of the expression pneumatics 25, 27, 28 or 29 is collapsed the pumping mechanism will establish a higher degree of exhaust within the reservoir 10 and also within the wind chest 5 before the valve 19 can operate to admit atmosphere. This results, in the specific construction shown, from a movement of the abutment 32 toward the fixed wall of the reservoir bellows and necessitates a further movement of the movable board 15 toward the fixed board 14 before the stem 21 of the valve will contact with the abutment 32. This movement of the board 15 elongates the spring 16 thereby increasing its pull upon the board 15 and necessitating a greater differential between exhaust and atmosphere to overcome and balance this increased pull.

For crescendo and diminuendo purposes the pneumatic 25 is herein selected. The interior of this pneumatic, which may be termed a crescendo pneumatic, is connected by a duct 33 with a valve box 34. Ducts 35 and 36 connect a wind chest 37 within the valve box 34 with the wind trunk 4 so that this wind chest 37 is always in communication with the interior of the reservoir bellows 10. The duct 33 is connected with the channel 38 in the valve box which leads to a valve chamber 39 having a port 40 to atmosphere and a port 41 to the exhaust chamber 37. A valve 42 is mounted within the valve chamber 39 and its stem rests upon a diaphragm 43 covering a diaphragm chamber 44. The usual bleed is provided in this and similar diaphragms. A duct 45 leads from this diaphragm chamber to a vent 45′ in the tracker bar 8. In the channel 38 are two obstruction screws 46 and 47, of which the screw 46 restricts the channel 38 to a greater extent than the screw 47. A by-pass 48 is provided, which when open permits the passage of air around the obstruction screw 46. A by-pass valve 49 is mounted upon a diaphragm 50 over a diaphragm chamber 51. This diaphragm chamber is connected by a channel 52 with a valve chamber 53 having a port 54 to atmosphere and a port 55 to the exhaust chamber 37. A valve 56 is mounted in the valve chamber 53 and its stem rests upon a diaphragm 58 covering a diaphragm chamber 57. This diaphragm chamber is connected by a duct 59 with a vent 59′ in the tracker bar 8.

As the parts are shown in the drawings, the crescendo pneumatic 25 is open to atmosphere through the duct 33, channel 38 and atmosphere port 40. If the valve 42 is operated to close the atmosphere port 40 and open the exhaust port 41, as for instance, by the opening of the tracker vent 45′ by the note sheet, the pneumatic 25 will be placed in communication with reservoir bellows 10. Connecting the pneumatic 25 with the reservoir bellows 10 will tend to equalize the pressures upon opposite sides of the board 26 and initiate a collapsing movement of the pneumatic 25 due to the slight pressure of the spring 23 through the valve stem 21. This results in a partial closing of the valve 19, a reduction in the amount of atmosphere drawn through the port 20 and a consequent slight increase in the degree of exhaust within the reservoir bellows 10. This increase is accompanied by a further increase within the pneumatic 25 and a further collapse of the reservoir bellows. This action will continue until the pneumatic 25 is fully collapsed. The communication between the pneumatic 25 and reservoir bellows 10, in the described operation, is restricted by the obstruction screw 47 which provides the greater restriction. This restriction in communication will retard the equalizing of pressures within the pneumatic 25 and bellows 10 so that the collapsing movement of the pneumatic 25 will be slowed up and the consequent increase of the degree of exhaust within the bellows 10 accomplished slowly at a speed appropriate to a slow crescendo.

A slow diminuendo, which will accompany a slow decrease in the degree of exhaust within bellows 10, may be accomplished by admitting atmosphere slowly to pneumatic 25 as for instance by the closing of exhaust port 41 and the opening of atmosphere port 40 by the valve 42. This valve operation may be initiated by closing the tracker vent 45′. The apparatus thus has the capacity of producing a slow crescendo and a slow diminuendo. To provide for faster crescendo and diminuendo operations the valve 56 may be appropriately operated to by-pass the obstruction screw 46, which may be conveniently called the slow crescendo adjustment screw, while 47 may be called the fast crescendo adjustment screw. For example, if a fast crescendo is desired the tracker ducts 45 and 59 may be simultaneously opened thereby operating valves 42 and 56 simultaneously; the result of operation of valve 42 being to connect the pneumatic 25 with the interior of the reservoir bellows 10 and the result of operation of the valve 56 being to by-pass obstruction screw 46 and thus enlarge the effective opening of the channel 38.

As will be readily understood by those skilled in the art, a crescendo may be started at one speed and changed to another speed intermediate its extreme limits; a fast diminuendo may follow a slow crescendo and vice versa and other varying combinations of crescendo and diminuendo effects can be produced.

Having sufficiently described the regulating functions of the apparatus, the crescendo and diminuendo functions, the manner of producing incremental intensity changes will now be described.

It is desirable to have the apparatus capable of producing substantially instantaneous incremental changes, of varying degrees, in playing intensities. For this purpose the pneumatics 27, 28, and 29 are utilized. These pneumatics are of different sizes arranged so that they may be collapsed individually or in combination to effect their separate or combined results as presently described.

A description of the operation of one of these pneumatics, for instance pneumatic 27, will suffice for all. The interior of pneumatic 27 is connected by a flexible duct 60, a nipple 61, a duct 62 and a channel 63 with a valve chamber 64 having a port 65 to atmosphere and a port 66 to an exhaust chamber 67. This exhaust chamber is connected by a duct 68, a duct 69, the duct 35 and the wind trunk 4 with the interior of the reservoir bellows 10. A secondary valve 70 is mounted in the valve chamber 64 and its stem rests upon a diaphragm 71 covering a diaphragm chamber 72. This diaphragm chamber 72 is connected by a channel 73 with a valve chamber 74 having a port 75 to atmosphere and a port 76 to the exhaust chamber 67. A duplex valve 77 is mounted within the valve chamber 74 and rests upon a diaphragm 78 over a diaphragm chamber 79. The diaphragm chamber 79 is connected by a duct 80, with a tracker vent correspondingly numbered. The parts last described are duplicated for pneumatics 28 and 29 and bear the same numbers with indices "*a*" and "*b*" respectively.

In describing the operation of the pneumatics 27, 28 and 29 it will be assumed that atmosphere is present at all times in the crescendo pneumatic 25. If the tracker vent 80 is opened to admit atmosphere under the diaphragm 78, the valve 77 will be operated to close exhaust port 76 and open atmosphere port 75 thus admitting atmosphere to the channel 73 and to the diaphragm chamber 72. The admission of atmosphere to this diaphragm chamber will operate valve 70 to close atmosphere port 65 and open exhaust port 66 thus placing the pneumatic 27 in communication with the interior of the reservoir bellows 10. This communication between the pneumatic 27 and the reservoir bellows 10, being free and unrestricted the pressure within pneumatic 28 will be equalized with the pressure in the reservoir bellows 10 substantially instantaneously and will inaugurate a collapsing movement of the pneumatic 27 in the manner previously described in connection with pneumatic 25, with the exception that the complete collapse of pneumatic 27 will be attained substantially instantaneously.

This quick collapse of the pneumatic 27 will be accompanied by a quick collapse of the reservoir bellows and a corresponding increase in the degree of exhaust therein and in the wind chest 5 to increase playing intensities by a substantially distinct increment. Upon closing the tracker vent 80, atmosphere will be suddenly admitted to the pneumatic 27 and it will tend to open the valve 19 thus permitting a quick expansion of the reservoir bellows and a consequent sudden decrease in the degree of exhaust therein.

It will be readily understood that the extent of this incremental change in playing intensity will bear a certain relation to the extent of movement of the pneumatic 27. If, therefore, pneumatics 28, and 29 are of a different size, incremental changes of different extents may be secured by the separate collapse of any of these bellows. It will also be understood that the bellows may be collapsed in varying combinations thereby providing a substantial range of incremental intensity changes.

It is desired that the maximum degree of exhaust which may be inaugurated by the crescendo mechanism be substantially the same as the maximum degree of exhaust attainable by step change mechanism and therefore the movement of the abutment 32, by the collapse of the crescendo pneumatic 25, is made substantially the same as its movement upon collapse of all three expression pneumatics 27, 28 and 29.

It is also desirable that the incremental intensity change mechanism and the crescendo mechanism be operable concurrently so that a crescendo effect may be superposed upon an existing incremental effect or a note or notes may be accented during the progress of a crescendo. To provide for this and to prevent the apparatus from exceeding the maximum a fixed arm 81 is mounted within the reservoir bellows and a collar 82 is threaded upon the valve stem 21. The collar 82 may be so adjusted upon the valve stem that it will come in contact with the arm 81 when the desired maximum degree of exhaust has been attained.

It will be readily understood by those skilled in the art how the superposing of expression effects may be accomplished by appropriate perforations in the note sheet. For example, if it is desired to accent a note during a slow crescendo any one or all of the pneumatics 27, 28 and 29 may be suddenly opened to the reservoir bellows 10 and atmosphere admitted again without disturbing the slow collapse of the pneumatic 25. Similarly if it is desired to start a crescendo from some intermediate step attained for instance by the collapse of pneumatic 27, the crescendo pneumatic 25 may be opened to the reservoir bellows and the abutment 32 will be slowly moved until the stop 82 comes in contact with the arm 81 when the maximum playing intensity has been attained. Many other and varied effects may be attained singly or in combination as will be understood by those skilled in the art.

It is to be understood that the invention shown in the diagrammatic construction of the drawings, may be variously modified and embodied within the scope of the subjoined claims.

I claim as my invention:

1. In an automatic musical instrument the combination of playing pneumatics; a wind chest therefor; a main source of power for operating the playing pneumatics; a reservoir bellows having constant communication with the main source of power and the wind chest for the playing pneumatics; and crescendo means within the reservoir bellows automatically operating to vary the action of said reservoir bellows to produce a substantially continuous progressional change in playing intensities for crescendo purposes.

2. In an automatic musical instrument the combination of playing pneumatics; a wind chest therefor; a main source of power for operating the playing pneumatics; a governor bellows having unrestricted communication with the main source of power and the wind chest for the playing pneumatics; a tracker; and a tracker controlled crescendo pneumatic to vary the action of said governor bellows to produce a substantially continuous progressional change in playing intensities for crescendo purposes.

3. In an automatic musical instrument the combination of playing pneumatics; a wind chest therefor; a main source of power for operating the playing pneumatics; a governor bellows having unrestricted communication with the main source of power and the wind chest for the playing pneumatics; crescendo means to vary the action of said governor bellows to produce a substantially continuous progressional change in playing intensities for crescendo purposes; and speed governing means for the crescendo means.

4. In an automatic musical instrument the combination of playing pneumatics; a wind chest therefor; a main source of power for operating the playing pneumatics; a governor bellows having unrestricted communication with the main source of power and the wind chest for the playing pneumatics; a tracker; a tracker controlled crescendo pneumatic to vary the action of said governor bellows to produce a substantially continuous progressional change in playing intensities for crescendo purposes; and tracker controlled speed governing means for the crescendo pneumatic.

5. In an automatic musical instrument the combination of playing pneumatics; a wind chest therefor; a main source of power for operating the playing pneumatics; a governor bellows having unrestricted communication with the main source of power and the wind chest for the playing pneumatics; and expression means automatically operating to vary the action of the governor bellows by substantially distinct increments for producing incremental variations in playing intensities.

6. In an automatic musical instrument the combination of playing pneumatics; a wind chest therefor; a main source of power for operating the playing pneumatics; a governor bellows having unrestricted communication with the main source of power and the wind chest for the playing pneumatics; a tracker; and tracker controlled expression means to vary the action of the governor bellows by substantially distinct increments for producing incremental variations in playing intensities.

7. In an automatic musical instrument the combination of playing pneumatics; a wind chest therefor; a main source of power for operating the playing pneumatics; a reservoir bellows provided with a port to atmosphere and having constant communication with the main source of power and the wind chest for the playing pneumatics; a valve to control admission of atmosphere to said reservoir bellows; an abutment against which said valve normally bears; and means to move said abutment slowly to produce crescendo effects in playing intensities.

8. In an automatic musical instrument the combination of playing pneumatics; a wind chest therefor; a main source of power for operating the playing pneumatics; a reservoir bellows provided with a port to atmosphere and having constant communication with the main source of power and the wind chest for the playing pneumatics; a valve to control admission of atmosphere to said reservoir bellows; an abutment against which said valve normally bears; a tracker; and tracker controlled means to move said abutment slowly to produce crescendo effects in playing intensities.

9. In an automatic musical instrument the combination of playing pneumatics; a wind chest therefor; a main source of power for operating the playing pneumatics; a reservoir bellows provided with a port to atmosphere and having constant communication with the main source of power and the wind chest for the playing penumatics; a valve to control admission of atmosphere to said reservoir bellows; an abutment against which said valve normally bears; and means to move said abutment suddenly to produce incremental changes in playing intensities.

10. In an automatic musical instrument the combination of playing pneumatics; a wind chest therefor; a main source of power for operating the player pneumatics; a reservoir bellows provided with a port to atmosphere and having constant communication with the main source of power and the wind chest for the playing pneumatics; a valve to control admission of atmosphere to said reservoir bellows; an abutment against which said valve normally bears; a tracker; and tracker controlled means to move said abutment suddenly to produce incremental changes in playing intensities.

11. In an automatic musical instrument the combination of playing pneumatics; a wind chest therefor; a main source of power for operating the playing pneumatics; a reservoir bellows having constant communication with the main source of power and the wind chest for the playing pneumatics; a valve to control admission of atmosphere to said reservoir bellows; an abutment against which said valve normally bears; means to move said abutment slowly to produce crescendo effects in playing intensities; and means to move said abutment suddenly to produce incremental changes in playing intensities.

12. In an automatic musical instrument the combination of playing pneumatics; a wind chest therefor; a main source of power for operating the playing pneumatics; a reservoir bellows having a port to atmosphere and connected to the wind chest for the playing pneumatics; a valve controlling said atmosphere port to said reservoir bellows; a valve governing pneumatic mounted within said reservoir bellows; and means to place said pneumatic in communication with said reservoir bellows to vary playing intensities.

13. In an automatic musical instrument the combination of playing pneumatics; a wind chest therefor; a main source of power for operating the playing pneumatics; a reservoir bellows having a port to atmosphere and connected to the wind chest for the playing pneumatics; a valve controlling said atmosphere port to said reservoir bellows; a valve governing crescendo pneumatic mounted within said reservoir bellows; and means to place said pneumatic in communication with said reservoir bellows through a restricted opening.

14. In an automatic musical instrument the combination of playing pneumatics; a wind chest therefor; a main source of power for operating the playing pneumatics; a reservoir bellows having a port to atmosphere and connected to the wind chest for the playing pneumatics; a valve controlling said atmosphere port to said reservoir bellows; a valve governing crescendo pneumatic mounted within said reservoir bellows; means providing restricted connections of different capacities from said pneumatic to said reservoir bellows; and means for selectively controlling said connections.

15. In an automatic musical instrument the combination of playing pneumatics; a wind chest therefor; a main source of power for operating the playing pneumatics; a reservoir bellows having a port to atmosphere and connected to the wind chest for the playing pneumatics; a valve controlling said atmosphere port to said reservoir bellows; a valve governing pneumatic mounted within said reservoir bellows; a tracker; and tracker controlled means to place said pneumatic in communication with said reservoir bellows to carry playing intensities.

16. In an automatic musical instrument the combination of playing pneumatics; a wind chest therefor; a main source of power for operating the playing pneumatics; a reservoir bellows having a port to atmosphere and connected to the wind chest for the playing pneumatics; a valve controlling said atmosphere port to said reservoir bellows; a valve governing crescendo pneumatic mounted within said reservoir bellows; a tracker; and tracker controlled means to place said pneumatic in communication with said reservoir bellows.

17. In an automatic musical instrument the combination of playing pneumatics; a wind chest therefor; a main source of power for operating the playing pneumatics; a reservoir bellows having a port to atmosphere and connected to the wind chest for the playing pneumatics; a valve controlling said atmosphere port to said reservoir bellows; a valve governing crescendo pneumatic mounted within said reservoir bellows; means providing restricted connections of different capacities from said pneumatic to said reservoir bellows; a tracker; and tracker controlled means for selectively opening and closing said connections.

18. In an automatic musical instrument the combination of playing pneumatics; a wind chest therefor; a main source of power for operating the playing pneumatics; a reservoir bellows having a port to atmosphere and connected to the wind chest for the playing pneumatics; a valve controlling said atmosphere port to said reservoir bellows; a plurality of valve governing pneumatics mounted within said reservoir bellows; and means for selectively connecting said pneumatics with said reservoir bellows.

19. In an automatic musical instrument the combination of playing pneumatics; a wind chest therefor; a main source of power for operating the playing pneumatics; a reservoir bellows having a port to atmosphere and connected to the wind chest for the playing pneumatics; a valve controlling said atmosphere port to said reservoir bellows; a plurality of valve governing pneumatics mounted within said reservoir bellows; a tracker; and tracker controlled means for selectively connecting said pneumatics with said reservoir bellows.

20. In an automatic musical instrument the combination of playing pneumatics; a wind chest therefor; a main source of power for operating the playing pneumatics; a reservoir bellows having a port to atmosphere and connected to the wind chest for the playing pneumatics; a valve controlling said atmosphere port to said reservoir bellows; a plurality of valve governing pneumatics having different extents of movement mounted within said reservoir bellows; and means for selectively connecting said pneumatics with said reservoir bellows.

21. In an automatic musical instrument the combination of playing pneumatics; a wind chest therefor; a main source of power for operating the playing pneumatics; a reservoir bellows having a port to atmosphere and connected to the wind chest for the playing pneumatics; a valve controlling said atmosphere port to said reservoir bellows; a plurality of valve governing pneumatics having different extents of movement mounted within said reservoir bellows; a tracker; and tracker controlled means for selectively connecting said pneumatics with said reservoir bellows.

22. In an automatic musical instrument the combination of playing pneumatics; a wind chest therefor; a main source of power for operating the playing pneumatics; a reservoir bellows having a port to atmosphere and connected to the wind chest for the playing pneumatics; a valve controlling said atmosphere port to said reservoir bellows; a plurality of valve governing pneumatics mounted within said reservoir bellows; means to connect one of said pneumatics with said reservoir bellows through a restricted opening to produce crescendo effects in playing intensities; and means to connect other of said pneumatics selectively with said reservoir bellows through unobstructed openings to produce incremental effects in playing intensities.

23. In an automatic musical instrument, the combination of playing pneumatics; a wind chest therefor; a main source of power for operating the playing pneumatics; a governor bellows having unrestricted communication with the main source of power and the wind chest for the playing pneumatics; a tracker; and a tracker controlled expression means to vary the action of the governor bellows by substantially distinct increments for producing incremental variations in playing intensities and also to produce a substantially continuous progressive change in playing intensities for crescendo purposes.

24. In an automatic musical instrument the combination of a wind chest; a main source of power; a governor bellows having unrestricted communication with the main source of power and the wind chest; and expression means automatically operating to vary the action of the governor bellows by substantially distinct increments for producing incremental variations of pressure in the wind chest.

25. In an automatic musical instrument the combination of a wind chest; a main source of power; a governor bellows having unrestricted communication with the main source of power and the wind chest; and tracker controlled expression means to vary the action of the governor bellows by substantially distinct increments for producing incremental variations of pressure in the wind chest.

26. In an automatic musical instrument having the usual playing pneumatics and main source of power, in combination, a wind chest; a reservoir bellows having communication with atmospheric air and connected to the wind chest; a valve controlling said communication with atmospheric air; a valve governing pneumatic; and means to place said pneumatic in communication with said reservoir bellows to vary playing intensities.

27. In an automatic musical instrument having the usual playing pneumatics and a main source of power, in combination, a wind chest; a reservoir bellows having communication with atmospheric air and connected to said wind chest; a valve controlling said communication with atmospheric air; a valve governing pneumatic; a tracker; and tracker controlled means to place said pneumatic in communication with said reservoir bellows to vary playing intensities.

28. In an automatic musical instrument having the usual playing pneumatics and a main source of power, in combination, a wind chest; a reservoir bellows having communication with atmospheric air and connected to said wind chest; a valve controlling said communication with atmospheric air; a plurality of valve governing pneumatics; and means for selectively connecting said pneumatics with said reservoir bellows.

29. In an automatic musical instrument having the usual playing pneumatics and a main source of power, in combination, a wind chest; a reservoir bellows having communication with atmospheric air and connected to said wind chest; a valve controlling said communication with atmospheric air; a plurality of valve governing pneumatics having different extents of movement; and means for selectively connecting said pneumatics with said reservoir bellows.

30. In an automatic musical instrument having the usual playing pneumatics and a main source of power, in combination, a wind chest; a reservoir bellows having communication with atmospheric air and connected to said wind chest; a valve controlling said communication with atmospheric air; and a plurality of valve governing pneumatics having different extents of movement; a tracker; and tracker controlled means for selectively connecting said pneumatics with said reservoir bellows.

31. In combination with a musical instrument having playing pneumatics and a source of power, means to govern the action of the source of power including a pneumatic, means providing a port to atmosphere, a valve for said port controlled by the movable board of said pneumatic and supplementary tracker controlled pneumatics for varying the action of said first-named pneumatic upon said valve.

32. In an automatic musical instrument, having a wind chest and a main source of power, in combination, a regulator bellows having unrestricted communication with the main source of power and wind chest and adapted to maintain pressures therein at a substantially constant level; a tracker; and tracker controlled pneumatic means to vary the operation of said regulator to cause it to maintain pressures in said wind chest varying by predetermined increments.

33. In an automatic musical instrument, having a wind chest and a main source of power, in combination, a chamber having communication with the wind chest and source of power and having a movable wall responsive to changes of pressure therein; a port through which atmospheric air may be admitted to said chamber; a valve controlling said port; means whereby movement of the movable wall affects the valve to thereby maintain a predetermined pressure in the system at a substantially constant level; and pneumatic means for varying said last-named means to cause the position of the movable wall to be changed whereby the pressure maintained in the system is changed.

34. Expression controlling mechanisms for musical instruments having player pneumatics and a main source of power, including, in combination, an exhaust chamber having a port providing communication between said chamber and atmosphere, a valve controlling said port, a pneumatic controlling said valve, and a plurality of supplementary pneumatics for varying the action of said first-named pneumatic on said valve to vary exhaust in said exhaust chamber by perceptible increments.

35. Expression controlling mechanisms for musical instruments having player pneumatics and a main source of power, including, in combination, an exhaust chamber having a port providing communication between said chamber and atmosphere, a valve controlling said port, a pneumatic controlling said valve, and a plurality of supplementary pneumatics having different extents of movement for varying the action of said pneumatic on said valve to vary exhaust in said exhaust chamber by perceptible increments.

36. Expression controlling mechanisms for musical instruments having player pneumatics and a main source of power, including, in combination, an exhaust chamber having a port providing communication between said chamber and atmosphere, a valve controlling said port, a pneumatic controlling said valve, a plurality of supplementary pneumatics for varying the action of said first-named pneumatic on said valve to vary exhaust in said exhaust chamber by perceptible increments, a tracker, and valves controlled by said tracker to control the operation of said supplementary pneumatics.

37. Expression controlling mechanisms for musical instruments having player pneumatics and a main source of power, including, in combination, an exhaust chamber having a port providing communication between said chamber and atmosphere, a valve controlling said port, a pneumatic controlling said valve, a plurality of supplementary pneumatics having different extents of movement for varying the action of said first named pneumatic on said valve, a tracker, and valve devices controlled by said tracker for selectively operating said supplementary pneumatics to vary exhaust in said exhaust chamber by perceptible increments.

38. Expression controlling mechanisms for musical instruments having player pneumatics and a main source of power, including, in combination, an exhaust chamber having a port providing communication between said chamber and atmosphere, a valve controlling said port, a pneumatic controlling said valve, a plurality of supplementary pneumatics having different extents of movement for varying the action of said first named pneumatic on said valve, a tracker, and tracker controlled means for operating one of said supplementary pneumatics to vary exhaust in said exhaust chamber by a predetermined increment, and tracker controlled devices for operating a different supplementary pneumatic to vary exhaust in said chamber by a different increment.

In testimony whereof, this specification has been signed this 10th day of March, 1924.

AMERICAN PIANO COMPANY,
*Assignee of Guy Manly Russell, Deceased.*
By I. E. EDGAR,
*Treas.*